United States Patent
Chan et al.

(10) Patent No.: US 9,736,042 B2
(45) Date of Patent: *Aug. 15, 2017

(54) VISUALIZATION OF THE REACH OF A POST BY A MEMBER OF AN ON-LINE SOCIAL NETWORKING SYSTEM

(71) Applicant: LinkedIn Corporation, Mountain View, CA (US)

(72) Inventors: Kristen T. Chan, San Francisco, CA (US); Caroline Gaffney, San Francisco, CA (US); Marissa Dulaney, San Francisco, CA (US); Chanh Nguyen, Sunnyvale, CA (US); Roel Ramirez, Hayward, CA (US)

(73) Assignee: LinkedIn Corporation, Mountain View, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 14/562,460

(22) Filed: Dec. 5, 2014

(65) Prior Publication Data

US 2015/0172147 A1 Jun. 18, 2015

Related U.S. Application Data

(63) Continuation of application No. 14/105,800, filed on Dec. 13, 2013, now Pat. No. 8,930,819.

(51) Int. Cl.
*G06Q 10/10* (2012.01)
*H04L 12/26* (2006.01)
(Continued)

(52) U.S. Cl.
CPC .......... *H04L 43/045* (2013.01); *G06Q 10/10* (2013.01); *G06Q 50/01* (2013.01); *H04L 67/02* (2013.01); *H04L 67/10* (2013.01); *H04L 67/306* (2013.01)

(58) Field of Classification Search
CPC ..... H04L 43/045; H04L 67/306; H04L 67/10; G06Q 50/01
(Continued)

(56) References Cited

U.S. PATENT DOCUMENTS 6,883,170 B1 4/2005 Garcia
8,302,015 B2 10/2012 Krishnan et al.
(Continued)

OTHER PUBLICATIONS

"U.S. Appl. No. 14/105,800, Non Final Office Action mailed Mar. 31, 2014", 14 pgs.
(Continued)

*Primary Examiner* — Daeho Song
(74) *Attorney, Agent, or Firm* — Schwegman Lundberg & Woessner, P.A.

(57) ABSTRACT

A system for visualizing the reach of a post by a member of an on-line social networking system may be designed to increase awareness of the members, as to which degree their posted updates are noticed and reacted to by other members. When a member creates a post, either through the on-line social networking website itself or through an application programming interface (API) that allows to include a share user interface (UI) control on a third web party site, the system monitors events associated with the post, collects statistics with respect to the monitored events and uses this data to generate a visualization of the reach of that post. Example visualization provides the creator of the post a sense of how many other members interacted with the post.

18 Claims, 13 Drawing Sheets

(51) Int. Cl.
*H04L 29/08* (2006.01)
*G06Q 50/00* (2012.01)

(58) Field of Classification Search
USPC .......................... 715/736, 763, 764, 855
See application file for complete search history.

(56) References Cited

U.S. PATENT DOCUMENTS

| | | | |
|---|---|---|---|
| 8,548,918 B1 | 10/2013 | Amidon et al. | |
| 8,606,792 B1* | 12/2013 | Jackson | G06F 17/30699 707/748 |
| 8,812,958 B2* | 8/2014 | Willis | G06Q 10/10 715/736 |
| 8,930,819 B1 | 1/2015 | Chan et al. | |
| 9,027,105 B1* | 5/2015 | Saylor | H04L 63/08 707/705 |
| 9,311,683 B1* | 4/2016 | Saylor | H04L 67/22 |
| 2002/0072955 A1* | 6/2002 | Brock | G06Q 30/02 715/758 |
| 2004/0215793 A1* | 10/2004 | Ryan | G06Q 50/01 709/229 |
| 2005/0027845 A1* | 2/2005 | Secor | G06Q 10/087 709/223 |
| 2005/0034078 A1* | 2/2005 | Abbott | G06F 1/163 715/740 |
| 2005/0039132 A1* | 2/2005 | Germain | H04L 12/2602 715/736 |
| 2005/0039145 A1* | 2/2005 | Diering | G06F 17/30994 715/853 |
| 2005/0044502 A1* | 2/2005 | Fu | H04L 41/22 715/734 |
| 2005/0114795 A1* | 5/2005 | Beaudoin | G06T 11/206 715/854 |
| 2005/0138564 A1* | 6/2005 | Fogg | G06F 3/0481 715/745 |
| 2005/0198576 A1* | 9/2005 | Childress | G06F 11/324 715/736 |
| 2006/0004892 A1 | 1/2006 | Lunt et al. | |
| 2007/0180408 A1* | 8/2007 | Rusu | G06F 3/0481 715/855 |
| 2008/0148155 A1* | 6/2008 | Kogan | G06Q 10/10 715/736 |
| 2008/0209333 A1* | 8/2008 | Frei | G06T 11/206 715/736 |
| 2008/0222199 A1* | 9/2008 | Tiu | G06F 17/3089 |
| 2008/0307369 A1* | 12/2008 | Liu | G06T 11/206 715/855 |
| 2009/0007178 A1 | 1/2009 | Artom | |
| 2009/0133081 A1* | 5/2009 | Sakai | H04N 7/173 725/105 |
| 2009/0222750 A1 | 9/2009 | Jain et al. | |
| 2009/0327278 A1* | 12/2009 | Baran-Sneh | G06Q 30/02 |
| 2010/0057682 A1 | 3/2010 | Ramsay, Jr. et al. | |
| 2010/0058196 A1 | 3/2010 | Krishnan et al. | |
| 2010/0228614 A1* | 9/2010 | Zhang | G06Q 10/10 705/14.16 |
| 2010/0228631 A1* | 9/2010 | Zhang | G06Q 30/02 705/14.66 |
| 2010/0228826 A1 | 9/2010 | Marlow et al. | |
| 2011/0078173 A1 | 3/2011 | Seligmann et al. | |
| 2011/0113113 A1 | 5/2011 | Ryan et al. | |
| 2011/0154223 A1 | 6/2011 | Whitnah et al. | |
| 2011/0238754 A1 | 9/2011 | Dasilva et al. | |
| 2011/0246907 A1 | 10/2011 | Wang et al. | |
| 2011/0258550 A1* | 10/2011 | Dinh-Trong | G06Q 10/10 715/736 |
| 2011/0296004 A1 | 12/2011 | Swahar | |
| 2012/0023534 A1 | 1/2012 | Dasilva et al. | |
| 2012/0066606 A1* | 3/2012 | Zavgren, Jr. | H04L 41/22 715/736 |
| 2012/0191764 A1 | 7/2012 | Leibu et al. | |
| 2012/0197896 A1 | 8/2012 | Li et al. | |
| 2012/0197980 A1* | 8/2012 | Terleski | G06Q 50/01 709/203 |
| 2012/0215597 A1* | 8/2012 | Ross | G06Q 30/0201 705/14.1 |
| 2012/0245963 A1 | 9/2012 | Peak et al. | |
| 2013/0006882 A1* | 1/2013 | Galliani | G06Q 30/0217 705/319 |
| 2013/0014031 A1 | 1/2013 | Whitnah et al. | |
| 2013/0073985 A1 | 3/2013 | Hamlin et al. | |
| 2013/0211913 A1* | 8/2013 | Ross | G06Q 30/02 705/14.53 |
| 2014/0012769 A1 | 1/2014 | Wang et al. | |
| 2014/0047045 A1 | 2/2014 | Baldwin et al. | |
| 2014/0067933 A1 | 3/2014 | Sacks et al. | |
| 2014/0087780 A1* | 3/2014 | Abhyanker | G06Q 50/01 455/521 |
| 2014/0088944 A1* | 3/2014 | Natarajan | G06Q 30/02 703/13 |
| 2014/0096200 A1* | 4/2014 | Brown | G06F 21/6263 726/4 |
| 2014/0180944 A1* | 6/2014 | Baeck | G06Q 10/1053 705/321 |
| 2014/0181195 A1* | 6/2014 | Sullivan | H04L 67/22 709/204 |
| 2014/0181693 A1* | 6/2014 | Sullivan | G06Q 50/01 715/753 |
| 2014/0282096 A1* | 9/2014 | Rubinstein | H04L 65/403 715/753 |
| 2014/0297739 A1* | 10/2014 | Stein | H04L 67/22 709/204 |
| 2014/0310713 A1* | 10/2014 | Kaldor | G06F 9/485 718/102 |
| 2015/0127418 A1* | 5/2015 | Piepgrass | G06Q 30/0201 705/7.29 |

OTHER PUBLICATIONS

"U.S. Appl. No. 14/105,800, Notice of Allowance mailed Sep. 2, 2014", 16 pgs.
"U.S. Appl. No. 14/105,800, Response filed Jun. 30, 2014 to Non Final Office Action mailed Mar. 31, 2014", 11 pgs.

* cited by examiner

VISUALIZATION OF THE REACH OF A POST BY A MEMBER OF AN ON-LINE SOCIAL NETWORKING SYSTEM

CROSS-REFERENCE TO RELATED APPLICATIONS

The present application is a continuation of U.S. patent application Ser. No. 14/105,800, filed Dec. 13, 2013, which is incorporated herein by reference in its entirety.

TECHNICAL FIELD

This application relates to the technical fields of software and/or hardware technology and, in one example embodiment, to system and method to visualize the reach of a post by a member of an on-line social networking system.

BACKGROUND

An on-line social network may be viewed as a platform to connect people in virtual space. An on-line social network may be a web-based platform, such as, e.g., a social networking web site, and may be accessed by a user via a web browser. An on-line social network may be a business-focused social network that is designed specifically for the business community, where registered members establish and document networks of people they know and trust professionally. Each registered member may be represented by a member profile. A member profile may be represented by one or more web pages. A member's profile web page of a social networking web site may emphasize employment history and education of the associated member.

A member of on-line social network may be permitted to share information with other members by posting an update that would appear on respective news feed pages of the other members. An update may be an original message, a link to an on-line publication, a re-share of a post by another member, etc. Members that are presented with such an update on their news feed page may choose to indicate that they like the post, may be permitted to contribute a comment, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
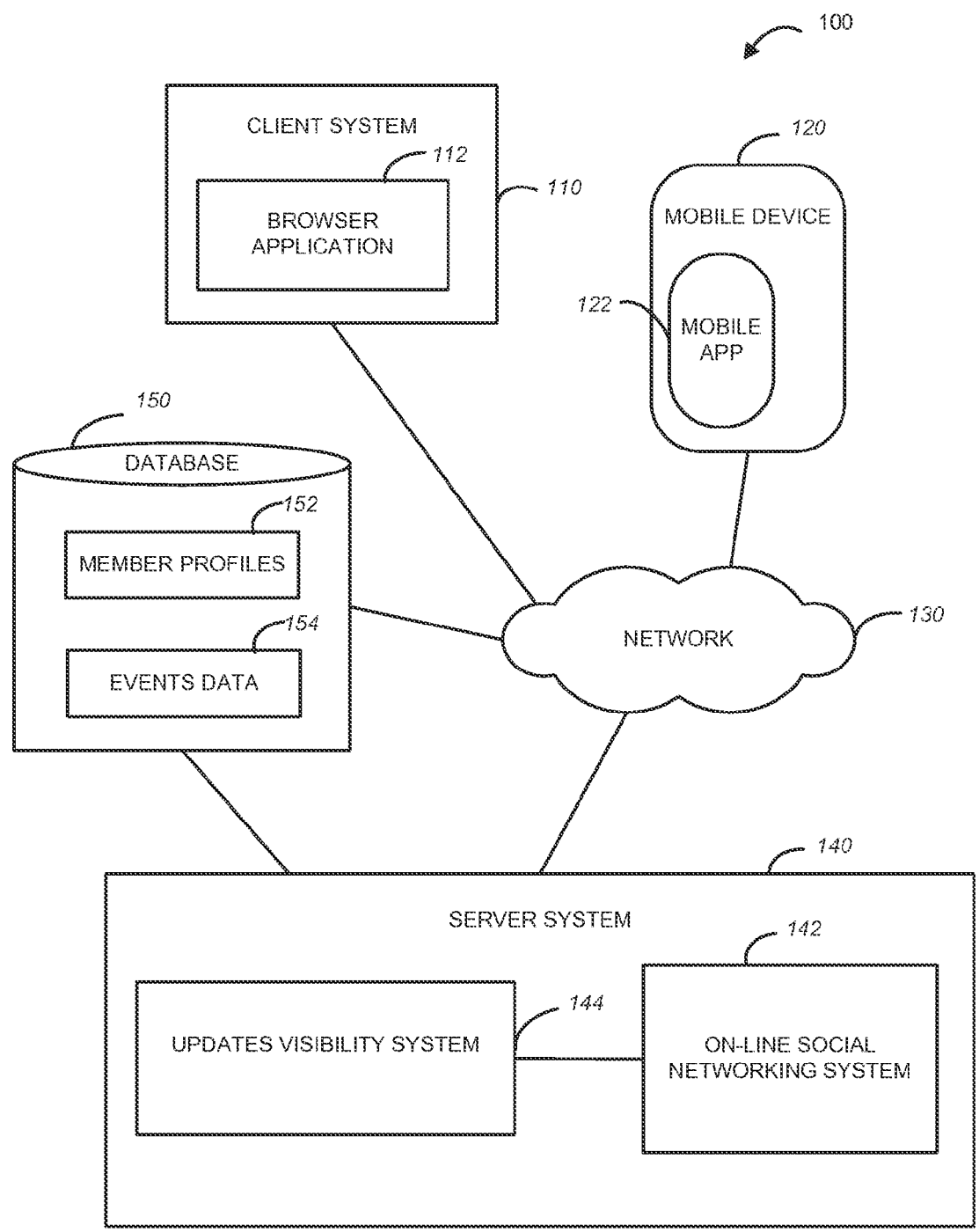
FIG. 1 is a diagrammatic representation of a network environment within which an example method and system to visualize the reach of a post by a member of an on-line social networking system may be implemented.

A method and system to visualize the reach of a post by a member of an on-line social networking system is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method describe herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate that member's connection to other members of the social network. Any two members of a social network may indicate their mutual willingness to be "connected" in the context of the social network, in that they can view each other's profiles, profile recommendations and endorsements for each other and otherwise be in touch via the social network. Members who are connected in the context of a social network may be termed each other's "connections."

An example system for visualizing the reach of a post by a member of an on-line social networking system may be designed to increase awareness of the members, as to which degree their posted updates are noticed and reacted to by other members. For the purposes of this description, the terms post, update, and share may be used interchangeably to describe information provided by a member that is viewable by other members on their respective customized news feed web pages. A member who created such an update may be referred to as a focus member to distinguish this member from other members who may be viewing the post, commenting with respect to the post, re-sharing the post, etc. A system for visualizing the reach of a post by a member of an on-line social networking system may be referred to as an updates visibility system.

When a member creates a post, either through the on-line social networking website itself or through an application programming interface (API) that allows to include a share user interface (IA) control on a third web party site, the updates visibility system captures what has been shared and tracks who has viewed it, who liked it, who commented on it, as well as who has re-shared it and who has clicked on the post to view the shared item (e.g., an article). The updates visibility system monitors events associated with the post, collects statistics with respect to the monitored events and uses this data to generate a visualization of the reach of that post. Example visualization provides the creator of the post (the focus member) a sense of how many other members viewed and reacted to the post by commenting, liking, re-sharing, etc. In the context of an on-line social networking system, the operation of liking entails a member clicking on a "like" visual control that may be provided as associated with a post.

The events associated with the post may be shown in the visualization generated by the updates visibility system as dots having a color or pattern that represents respective types of one or more associated events. The events associated with the post may be represented by other symbols or graphics and may be differentiated by the use of different shapes, sizes, positioning, etc. A single item of graphics, e.g., a dot, may represent a single event or several events. In one embodiment, the dots representing events associated with a post are separated by the associated connection distance between the focus member and the originator of the event. For example, the dots associated with events originated by the first degree connections of the focus member are shown closer to a certain focal point of the visualization, and also separated from the dots that represent reactions of members having greater connection distance with respect to the focus members. Connection distance may be expressed in degrees, where direct connections of a member are considered first degree connections, other members that are not directly connected to the member but connected to at least one of the member connections are considered second degree connections, still further members that are not directly connected to the members and are not connections of the member's connections but are connections of the second degree connections of the member are considered third degree connections, etc.

Figure 4:
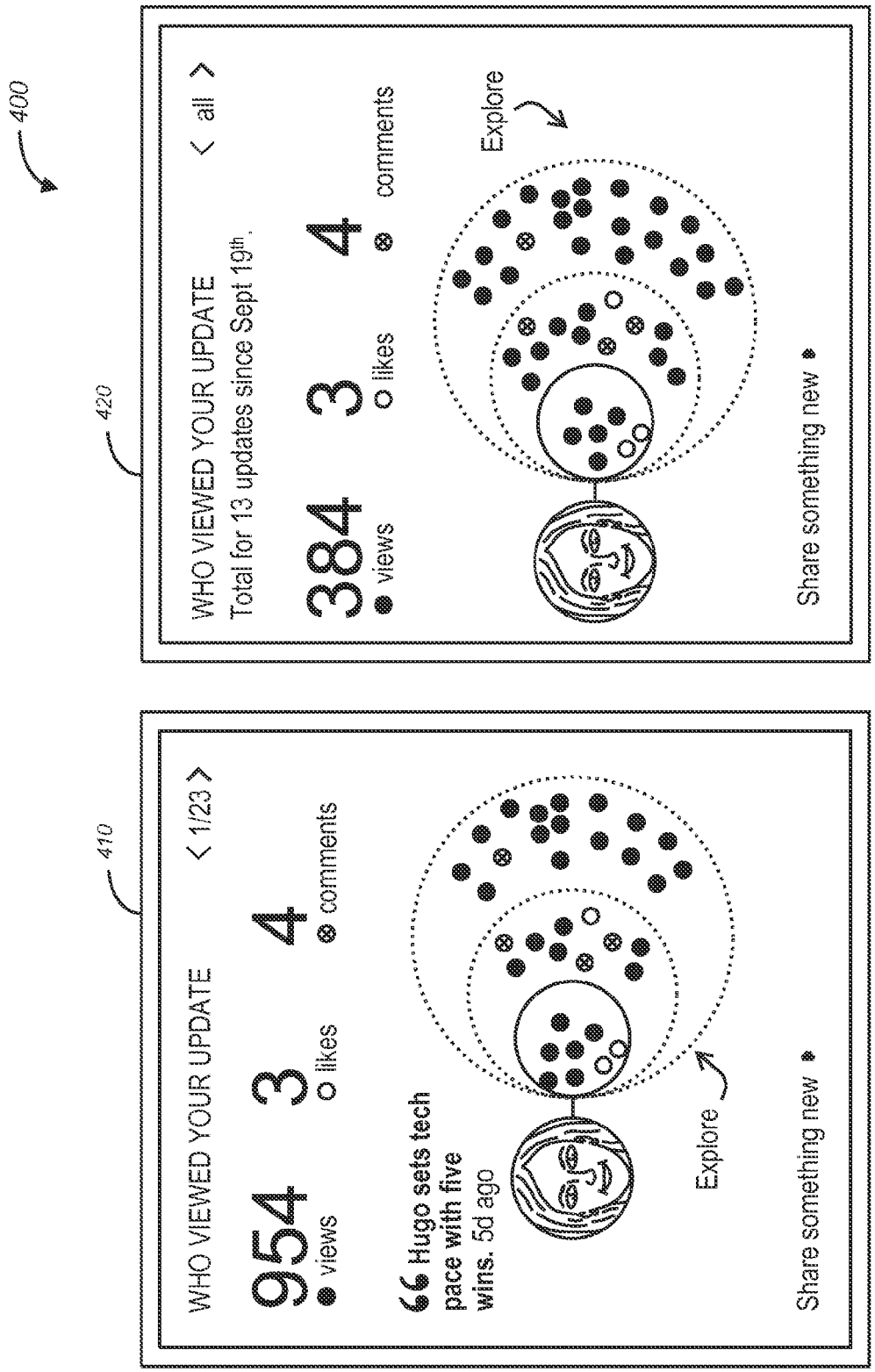
FIG. 4 is an illustration of a visualization of member reactions to a single post by a member and visualization of member reactions with respect to two or more posts, in accordance with an example embodiment.

Visualization of data with respect to a post may be provided, automatically, on the customized news feed web page of the focus member, or, e.g., on the profile page of the focus member. In some embodiments, rolling over the visualization (e.g., positioning a cursor over the visualization or touching the area of a touch screen where the visualization is being presented) may cause the content of the post to be presented, e.g., the content of the article that is the subject of the post))). In one embodiment, the updates visibility system may also be configured to generate visualizations of events associated with multiple posts may be termed an aggregate visualization. Example single-post and aggregate visualizations are illustrated in FIG. 4, which is described further below.

An example method and system to visualize the reach of a post by a member of an on-line social networking system may be implemented in the context of a network environment 100 illustrated in FIG. 1. As shown in FIG. 1, the network environment 100 may include client systems 110 and 120 and a server system 140. The server system 140, in one example embodiment, may host an on-line social networking system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may run respective browser applications (such as, e.g., a browser application 112) and/or respective mobile applications (such as, e.g., a mobile app 122) and may have access to the server system 140 via a communications network 130. The communications network 130 may be a public network (e.g., the Internet, a mobile communication network, or any other network capable of communicating digital data). As shown in FIG. 1, the server system 140 also hosts an updates visibility system 144. In one example embodiment, the updates visibility system 144 is configured to track events associated with a post by a focus member and to generate visualizations of the tracked events. The tracked events may be stored in the database 150 as events data 154. An example updates visibility system is illustrated in FIG. 2.

Figure 2:
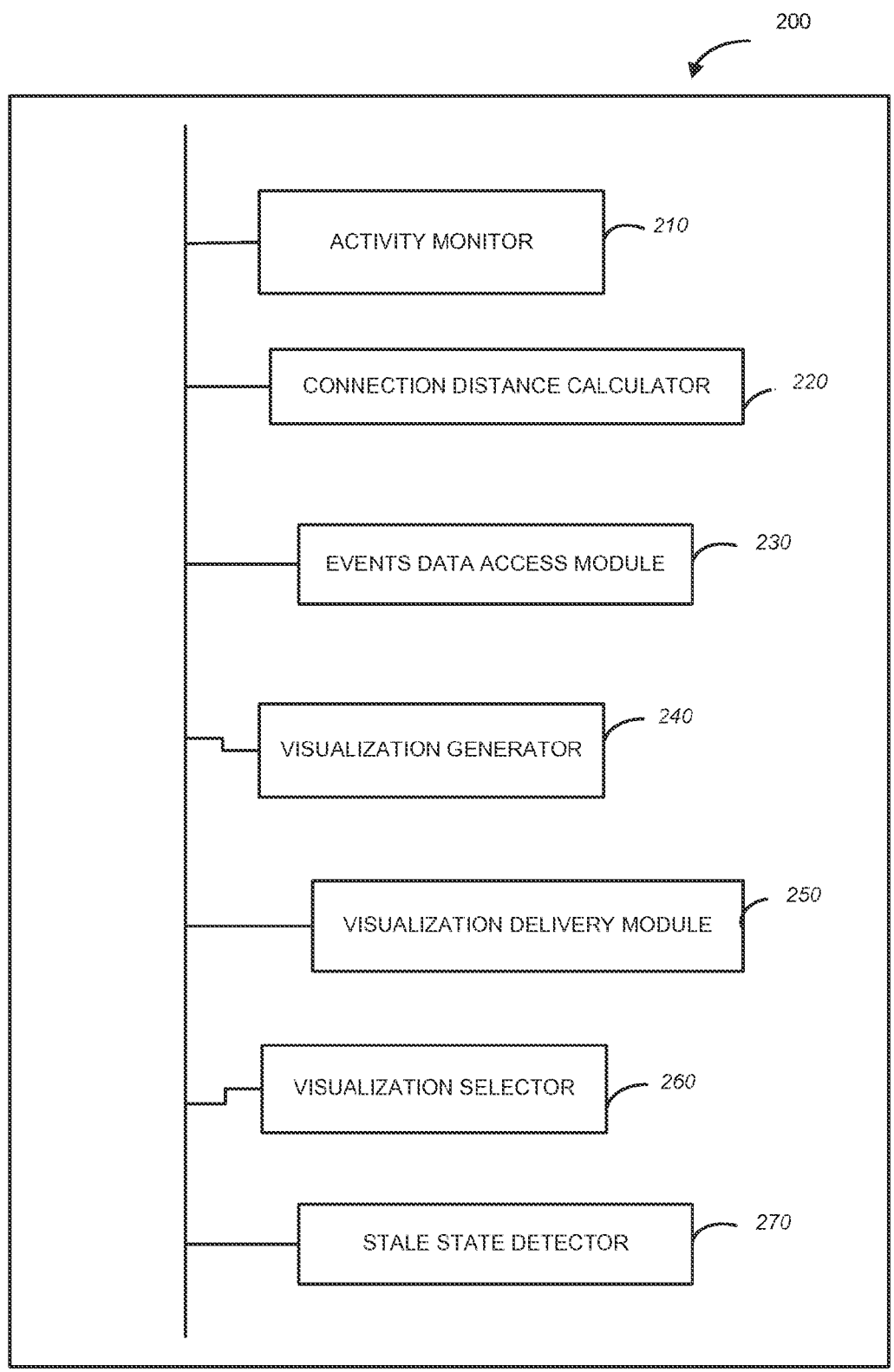
FIG. 2 is block diagram of a system to visualize the reach of a post by a member of an on-line social networking system, in accordance with one example embodiment.

FIG. 2 is a block diagram of a system 200 to visualize the reach of a post by a member of an on-line social networking system, in accordance with one example embodiment. As shown in FIG. 2, the system 200 includes an activity monitor 210, a connection distance calculator 220, an events data access module 230, a visualization generator 240, and a visualization delivery module 250. The activity monitor 210 may be configured to monitor activity in the on-line social networking system 142 with respect to an update posted by a focus member (a post), and to collect the events data for each event associated with the post. The monitored events may be views of the posted update, clicks on the post, likes, comments, re-shares, etc. The connection distance calculator 220 may be configured to determine a member that originated the event (the originator member) and a connection distance between the originator member and the focus member. The events data access module 230 may be configured to access events data associated with a particular post by the focus member. The visualization generator 240 may be configured to generate a visualization of the events data. The visualization of the events data includes respective visual representations of the one or more events. Example visualizations are described further below, e.g., with respect to FIG. 4. The respective visual representations of the one or more events may reflect connection distances of respective members of the on-line social network associated with the one or more events. A connection distance indicates a degree of association between a member who initiated an event associated with the post and the focus member who created the post. The visualization delivery module 250 may be configured to communicate the visualization of the events data to a client system for presentation on a customized news fed page of the focus member. The visualization generator 240 may also be configured to generate a so-called aggregate visualization based on events data collected by the activity monitor 210 with respect to two or more posts by a member. An example aggregate visualization is illustrated in FIG. 4, which is described further below.

Also shown in FIG. 2 is a visualization selector 260. The visualization selector 260 may be configured to randomly select between one or more visualizations of the events data with respect to respective single posts and an aggregate visualization for presentation on a customized news feed page of the focus member. The process of determining whether to present a visualization of member reactions to one or several posts and determining which visualization is to be presented is described further below with reference to FIG. 5.

Also shown in FIG. 2 is a stale state detector 270. The stale state detector 270 may be configured to detect lack of recent activity with respect to a post and present a lack of recent activity message to the focus member. The stale state detector 270 may also be configured to identify a post as "stale" based on how recently the post has been created and how recently an event associated with the post has been detected.

Figure 3:
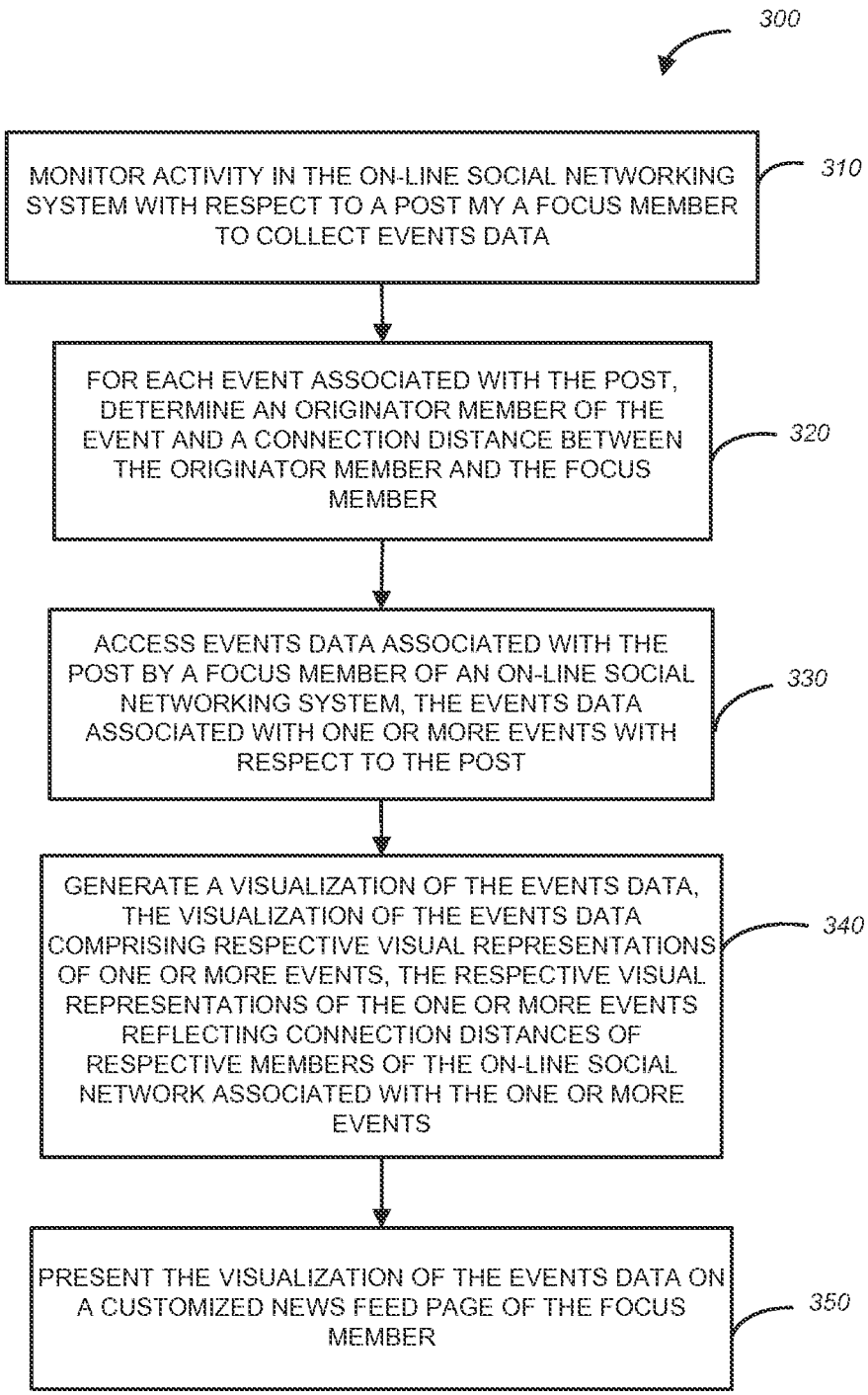
FIG. 3 is a flow chart of a method to visualize the reach of a post by a member of an on-line social networking system, in accordance with an example embodiment.

FIG. 3 is a flow chart of a method 300 to visualize the reach of a post by a member of an on-line social networking system, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the activity monitor 210 of FIG. 2 monitors activity in the on-line social networking system 142 with respect to an update posted by a focus member (a post) to collect events data for each event associated with the post. As explained above, the monitored events may be views of the posted update, clicks on the post, likes, comments, re-shares, etc. At operation 320, the connection distance calculator 220 of FIG. 2 determines a member that originated the event (the originator member) and a connection distance between the originator member and the focus member.

At operation 330, the events data access module 230 of FIG. 2 accesses events data associated with a particular post by the focus member and, at operation 340, the visualization generator 240 of FIG. 2 generates a visualization of the events data. The visualization of the events data includes respective visual representations of the one or more events. Example visualizations of events data are described further below, e.g., with respect to FIG. 4. As explained above, a visual representation of events associated with a post may reflect connection distances of respective members of the on-line social network associated with the one or more events. A connection distance indicates a degree of association between a member of the on-line social networking system and the focus member. The visualization delivery module 250 of FIG. 2 communicates the visualization of the events data to a client system for presentation on a customized news feed page of the focus member, at operation 350.

FIG. 4 is an illustration 400 of visualization 410 of member reactions to a single post by a member and visualization of member reactions with respect to two or more posts—an aggregate visualization 420. The visualization 410 provides a user with information regarding events associated with a particular post (also referred to as an update), such as how many views were detected for the post, how many members liked it (e.g., how many members activated a "like" control associated with the post), and how many comments were submitted with respect to the post. Each type of event (e.g., the views, the likes, and the comments) is represented in the visualization 400 by respective symbols. In FIG. 4, for example, the events are represented by dots, where the type of an event is indicated by a particular pattern. The events associated with the post may be represented by other symbols or graphics and may be differentiated by the use of different shapes, sizes, positioning, etc. As is shown in the visualization 410, the events are represented by dots. The dots that represent events with respect to a post are also spatially separated, such as some of the dots appear in the inner-most circle 402, other dots appear in the next-tier circle 404, while still further dots appear in the outer circle 406. The three circles 402, 404, and 406 represent the degrees of connection of the member who posted the update (the focus member) and respective members of the on-line social networking system who interacted with the post, e.g., by viewing it, commenting on it, etc. The dots that appear in the inner-most circle 402 represent events associated with the post that were initiated by those members of the on-line social networking system that have a first-degree connection with the focus member. The dots that appear in the next-tier circle 404 represent events associated with the post that were initiated by those members of the on-line social networking system that have a second-degree connection with the focus member. The dots that appear in the outer circle 406 represent events associated with the post that were initiated by those members of the on-line social networking system that have a third-degree connection with the focus member.

As is shown in the visualization 420, events associated with the two or more posts are also represented by dots that are also spatially separated, such as some of the dots appear in the inner-most circle 412, other dots appear in the next-tier circle 414, while still further dots appear in the outer circle 416. The three circles 412, 414, and 416 represent the degrees of connection of the member (the focus member) who posted all updates represented in the aggregate visualization 420 and the other members of the on-line social networking system who interacted with the post, e.g., by viewing it, commenting on it, etc. The dots that appear in the inner-most circle 412 represent events associated with the post that were initiated by those members of the on-line social networking system that have a first-degree connection with the focus member. The dots that appear in the next-tier circle 414 represent events associated with the post that were initiated by those members of the on-line social networking system that have a second-degree connection with the focus member. The dots that appear in the outer circle 416 represent events associated with the post that were initiated by those members of the on-line social networking system that have a third-degree connection with the focus member. In some embodiments, the dots that appear in the outer circle 416 represent events associated with the post that were initiated by those members of the on-line social networking system that have a third-degree connection and beyond with the focus member.

Figure 5:
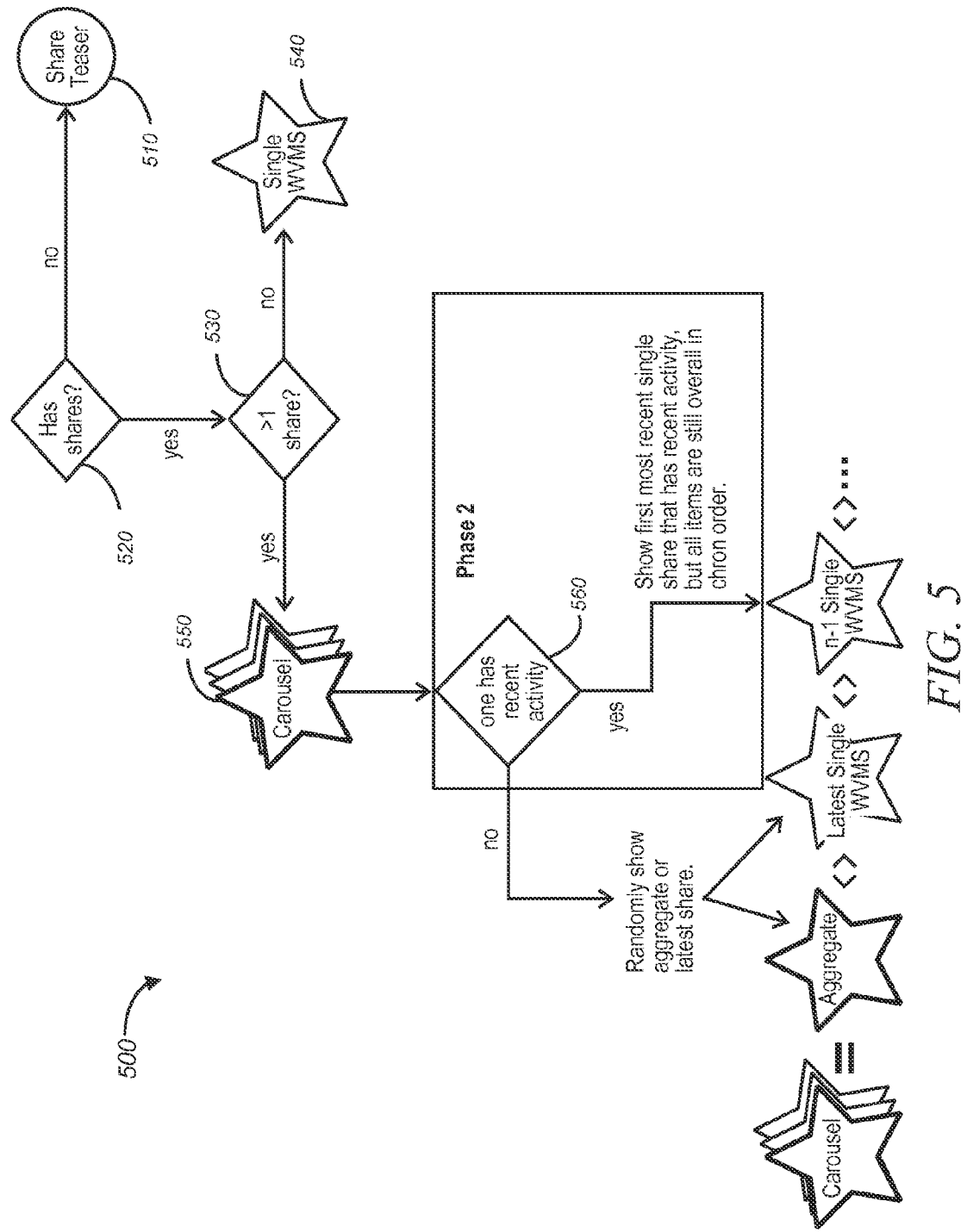
FIG. 5 is a flowchart of a process of determining whether to present a visualization of member reactions to one or several posts and determining which visualization is to be presented, in accordance with an example embodiment, in accordance with an example embodiment.

FIG. 5 is a flowchart 500 illustrating the process of determining whether to present a visualization of member reactions to one or several posts and determining which visualization is to be presented. As mentioned above, a visualization of member reactions to posts may be presented on a customized news feed page generated for the focus member. A visualization of member reactions to posts may also be presented on a profile page of the focus member or on yet another customized page generated for the focus member in the on-line social networking system.

At operation 510, the updates visibility system 144 of FIG. 1 determines whether a focus member has shares (whether the focus member has posted any updates that could be original posts, a link to further content, a re-share of a post by another member of the on-line networking system, etc.). If it is determined, at operation 510, that the focus member has not yet posted anything (or if the focus member has not posted anything for a predetermined period of time, such as, e.g., in the last two months), the updates visibility system 144 presents, at operation 520, a so called "share teaser" message, encouraging the focus member to start or to resume sharing information with the other members of the on-line social networking system. If it is determined, at operation 510, that the focus member has indeed posted at least one update, the updates visibility system 144 determines, at operation 530, whether the focus member has posted more than one update. If the focus member has posted just one update (or if only a single update by the focus member has been determined to be recent enough), the method 500 proceeds to operation 540 and the updates visibility system 144 generates a visualization of member reactions to a single post at operation 540, which may be similar to the visualization 410 shown in FIG. 4, or somewhat different, depending on how many events have been detected with respect to the post, which is described in further detail further below. The operation 540 has a label "Single WVMS," where the WVMS abbreviation stands for "Who Viewed My Share."

If it is determined, at operation 530, that the focus member has posted more than one update, the method 500 accesses carousel 550 and proceeds to operation 560. The carousel 550 comprises respective data bundles for the posts created by the focus member and also an aggregate data bundle for a combination of multiple posts created by the focus member. A data bundle may include data with respect to the events associated with the post and may also or alternatively include a representation of a visualization of the events associated with the post. At operation 560, the updates visibility system 144 determines whether one of the posts is associated with a recent activity (e.g., whether a recent event has been detected with respect to the post) and presents a visualization associated with a post that has been determined as associated with the most recent activity. If it has been determined, at operation 560, that none of the posts by the focus member are associated with recent activity (e.g., no member of the on-line networking system has views, commented on or re-shared any of the posts by the focus member for a predetermined amount of time), the updates visibility system 144 uses the carousel 550 to select, randomly or according to one or more rules, a single post visualization or an aggregate visualization to be presented to the focus member. In one embodiment, the visualizations are created on the fly. When the page loads, the data that is sent from the backend is processed and a visualization of the first post is rendered. When the user clicks on the "next" button, a request is made to the backend to fetch the next post and the visualization for that post is created. The carousel moves to show the corresponding post.

Figure 6:
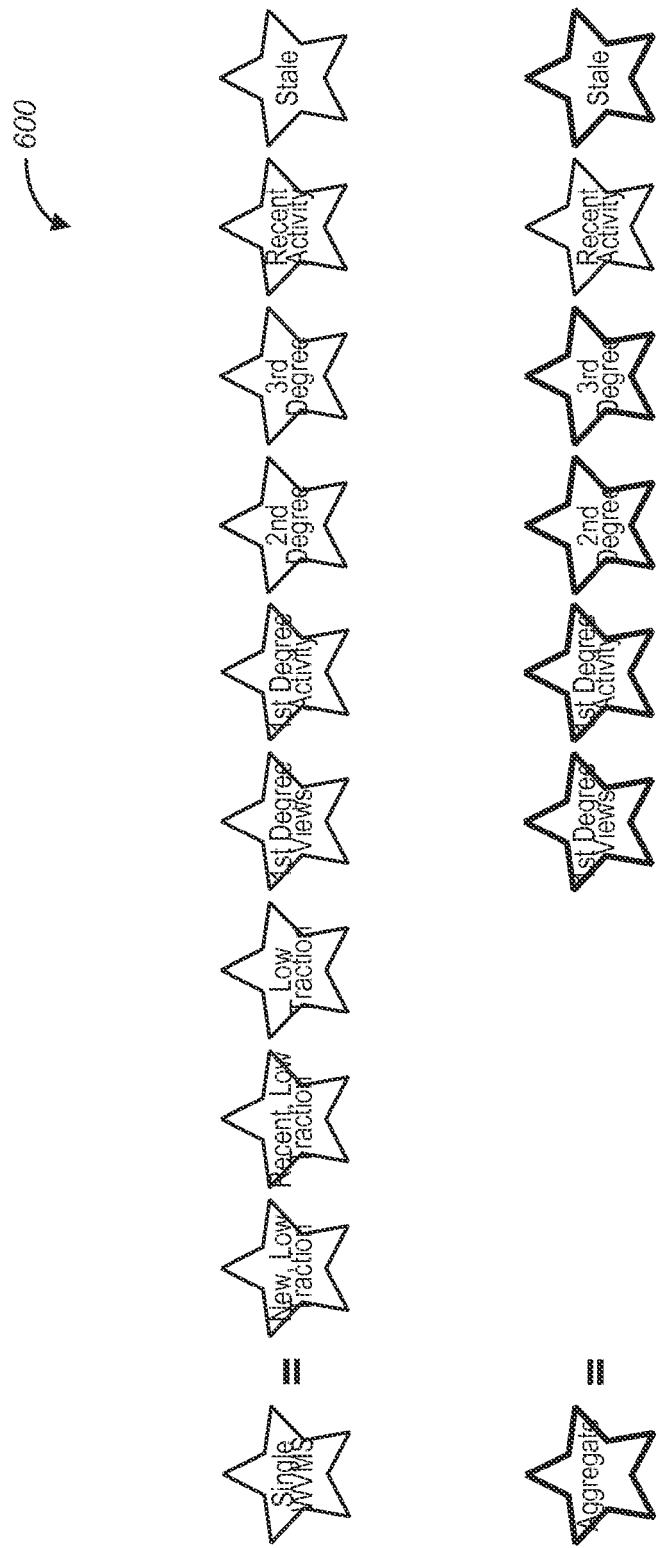
FIG. 6 is an illustration of various states of a data bundle represent events associated with a post, in accordance with an example embodiment.

FIG. 6 is an illustration 600 of various states of a data bundle representing events associated with a post. The states of a data bundle representing events associated with a post may indicate that the post is new and thus has not created much traction ("New, Low Traction"), that the post is recent with low traction ("Recent, Low Traction"), that the post has very little activity ("Low Traction"), that the post have been viewed by members that are first-degree connections of the focus member who posted the post ("$1^{st}$ Degree Views"), that there is activity other than views associated with the post initiated by members that are first-degree connections of the focus member ("$1^{st}$ Degree Activity"), that there are events associated with the post initiated by members that are second-degree connections of the focus member ("$2^{nd}$ Degree"), that there are events associated with the post initiated by members that are third-degree connections of the focus member ("$3^{d}$ Degree"), that there is recent activity associated with the post ("Recent Activity"), and that the post is stale ("Stale").

The state of a post may be determined based on one or more rules. For example, a post may be determined to have a state of "Low Traction" when the post has only view events (no "likes," comments, or re-shares, etc.), the total number of views is less than a predetermined value (e.g., less than 20), and if the post has been viewed only by members that are first-degree connections of the focus member. In one embodiment, a post may be determined to have a state of "Recent, Low Traction," if the post satisfies the conditions for the "Low Traction" status, but has been posted within a predetermined period of time (e.g., less than 12 hours ago). A post may have a state of "Recent," if the post has been created within a. predetermined period of time, e.g., within the last three days. The stale state of a post may be determined based on how recently the post has been created and also based on activity associated with the post in the on-line social networking system. For example, a post may be considered "Stale" if it was created more than five days ago or if no new events have been detected with respect to the post in the last 24 hours. In some embodiments, the state of a post may be displayed together with a post itself.

As shown in FIG. 6, the states of an aggregate data bundle representing events associated with multiple posts may indicate that one or more of the posts from the aggregate have been viewed by members that are first-degree connections of the focus member who posted the post ("$1^{st}$ Degree Views"), that there is activity other than views associated with one or more of the posts from the aggregate initiated by members that are first-degree connections of the focus member ("$1^{st}$ Degree Activity"), that there are events associated with one or more of the posts from the aggregate initiated by members that are second-degree connections of the focus member ("$2^{nd}$ Degree"), that there are events associated with one or more of the posts from the aggregate initiated by members that are third-degree connections of the focus member ("$3^{d}$ Degree"), that there is recent activity associated with one or more of the posts from the aggregate ("Recent Activity"), and that the aggregate is stale ("Stale").

Figure 7:
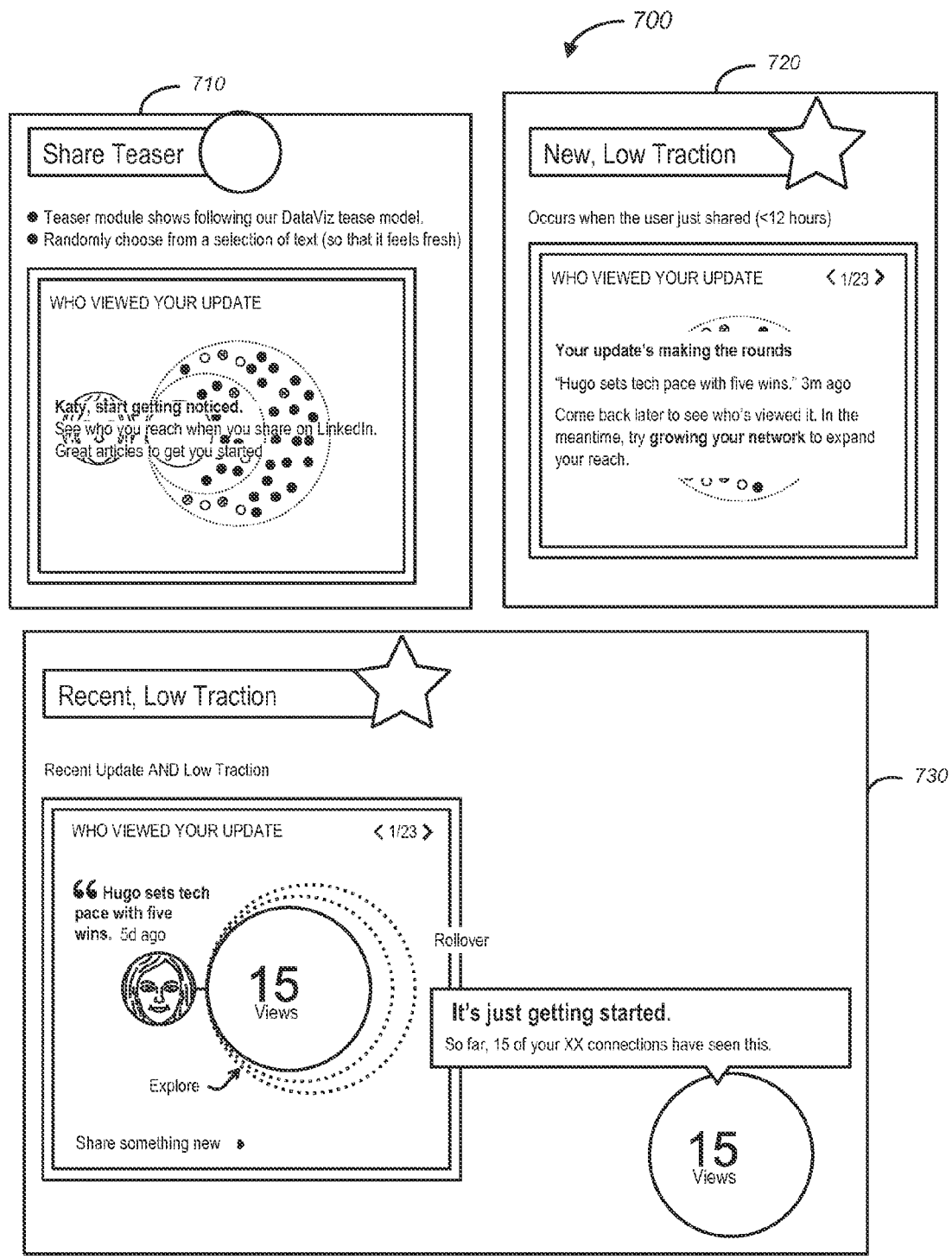
FIG. 7 is an illustration of visualizations generated by the updates visibility system, in accordance with an example embodiment.
Figure 8:
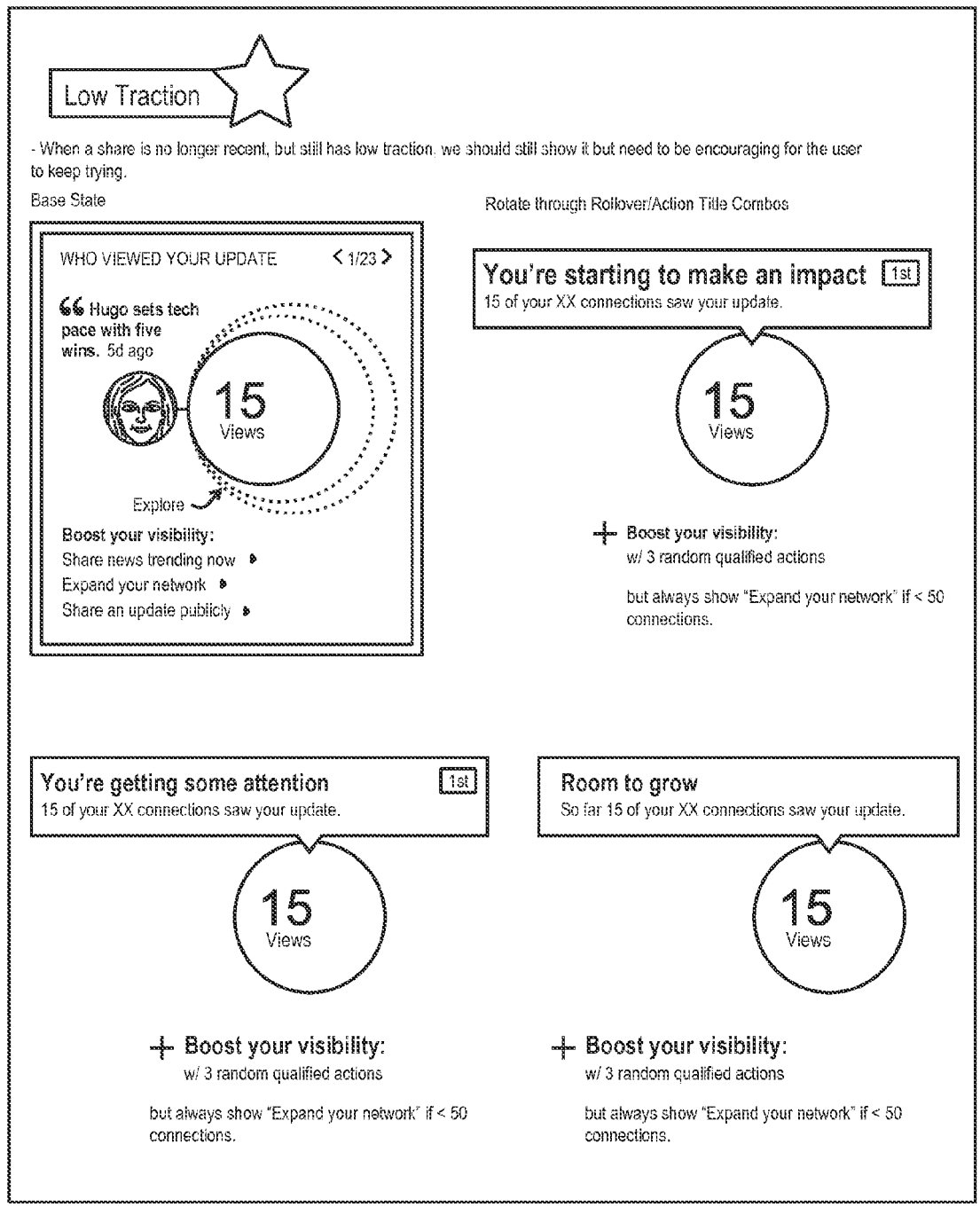
FIG. 8 is an illustration of information presented to a focus member with respect to a post that has a status "Low Traction," in accordance with an example embodiment.
Figure 9:
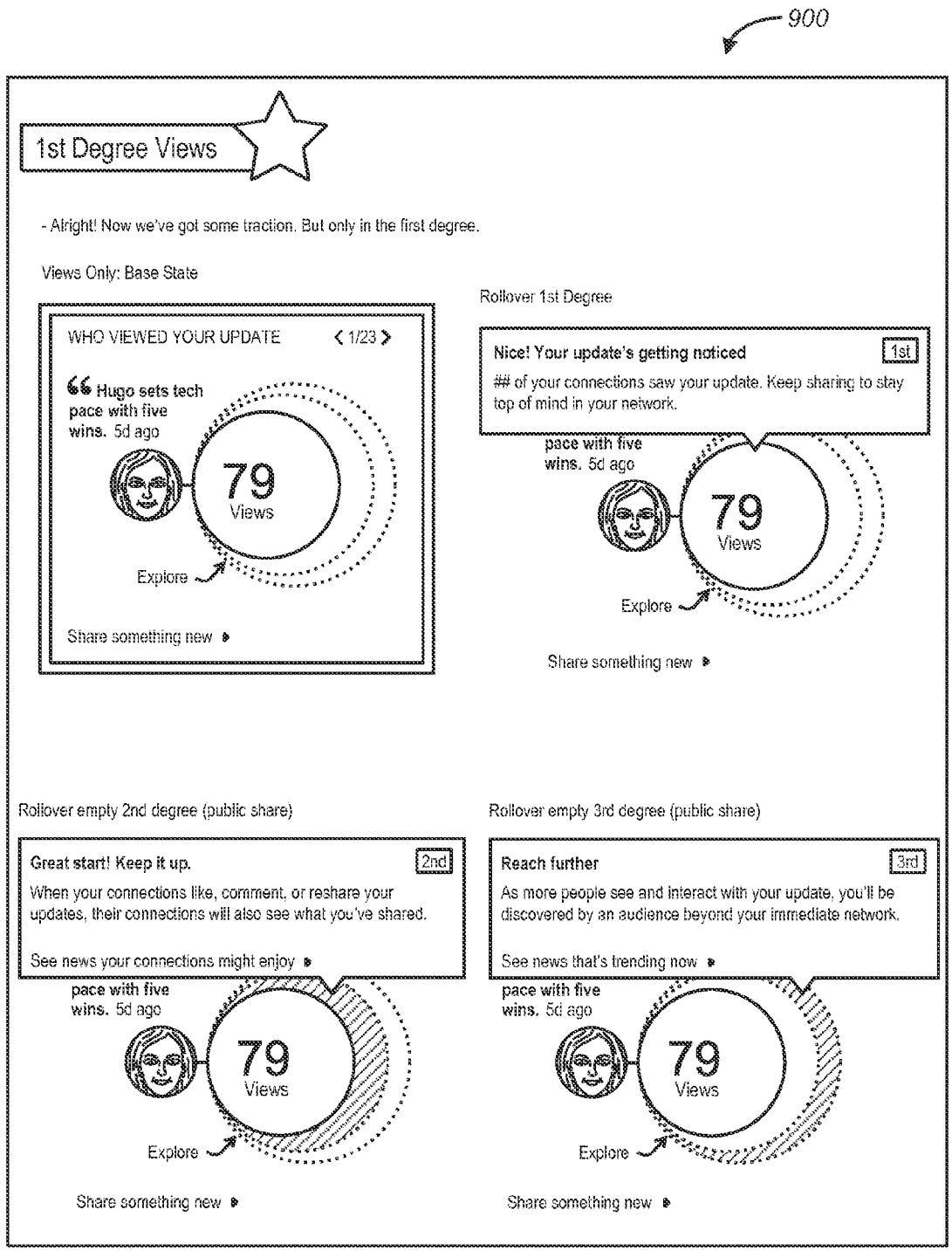
FIG. 9 is an illustration of information presented to a focus member with respect to a post that has a status "$1^{st}$ Degree Views," in accordance with an example embodiment.
Figure 10:
FIG. 10 is an illustration of information presented to a focus member with respect to a post that has a status "$1^{st}$ Degree Activity" or "$2^{nd}$ Degree," in accordance with an example embodiment.
Figure 11:
FIG. 11 is an illustration of information presented to a focus member with respect to a post that has a status "3d Degree," in accordance with an example embodiment.

FIG. 7 is an illustration 700 of visualizations generated by the updates visibility system 144 of FIG. 1. Visualization 710 is a so-called share teaser that encourages a member to start posting updates in the on-line social networking system. Visualization 720 provides an informational message to a focus member after the focus member created a post. Visualization 730 is with respect to a post that has a status "Recent, Low traction." FIG. 8 is an illustration 800 of information presented to a focus member with respect to a post that has a status "Low Traction." FIG. 9 is an illustration 900 of information presented to a focus member with respect to a post that has a status "1$^{st}$ Degree Views." FIG. 10 is an illustration 1000 of information presented to a focus member with respect to a post that has a status "1$^{st}$ Degree Activity" or "2$^{nd}$ Degree." FIG. 11 is an illustration 1100 of information presented to a focus member with respect to a post that has a status "3$^{d}$ Degree."

Figure 12:
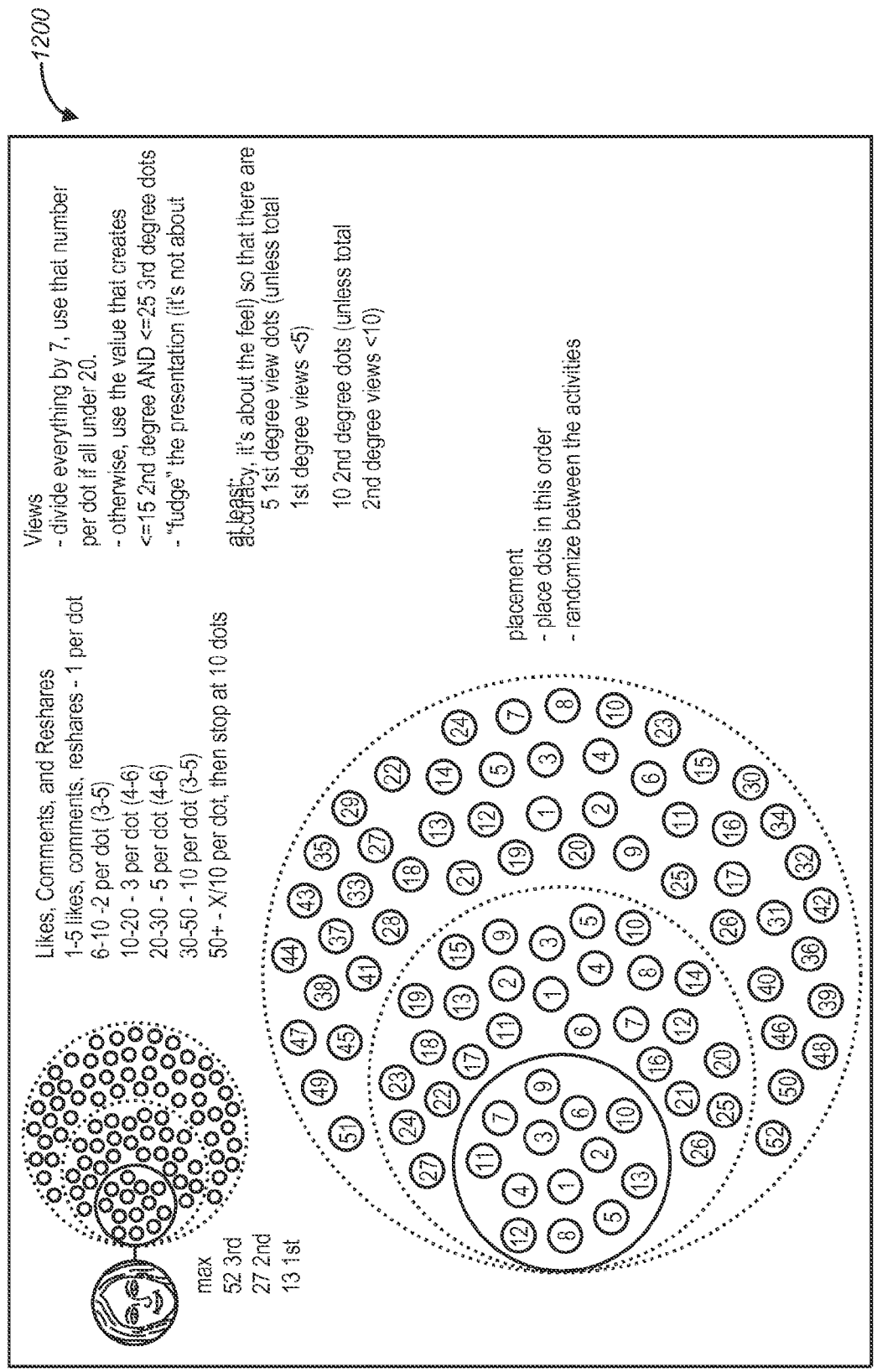
FIG. 12 is an illustration of an example approach, according to which the dots representing events are placed within the circles that correspond to respective connection distances between a focus member and respective members associated with the events.

As mentioned above, the updates visibility system 144 may be configured to place the representations of events (e.g., dots) within a visualization of reaction to post according to a predetermined logic. FIG. 12 is an illustration 1200 of an example approach, according to which the dots representing events are placed within the circles that correspond to respective connection distances between a focus member and respective members associated with the events. As shown in FIG. 12, a dot may represent multiple events and each consecutive dot may be placed in a predetermined position within a respective circle. For example, if the user has no posts that are eligible for visualization, the user may be presented with a teaser visualization that encourages the user to share post an update. Otherwise, the system 200 of FIG. 2 determines whether the post is associated with a predetermined default, with views and connections, with views only, with connections only, whether there are no events originated by the user's 2nd degree or the 3rd degree connections, and whether there are no events originated by the user's 3rd degree connections. The system 200 may then determine whether the subject visualization is associated with a default visualization type of with an aggregate visualization, setup height and width of visualization, and draw a visualization based on the determined parameters. The radii of circles and the position of dots are based on predetermined values. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 13:
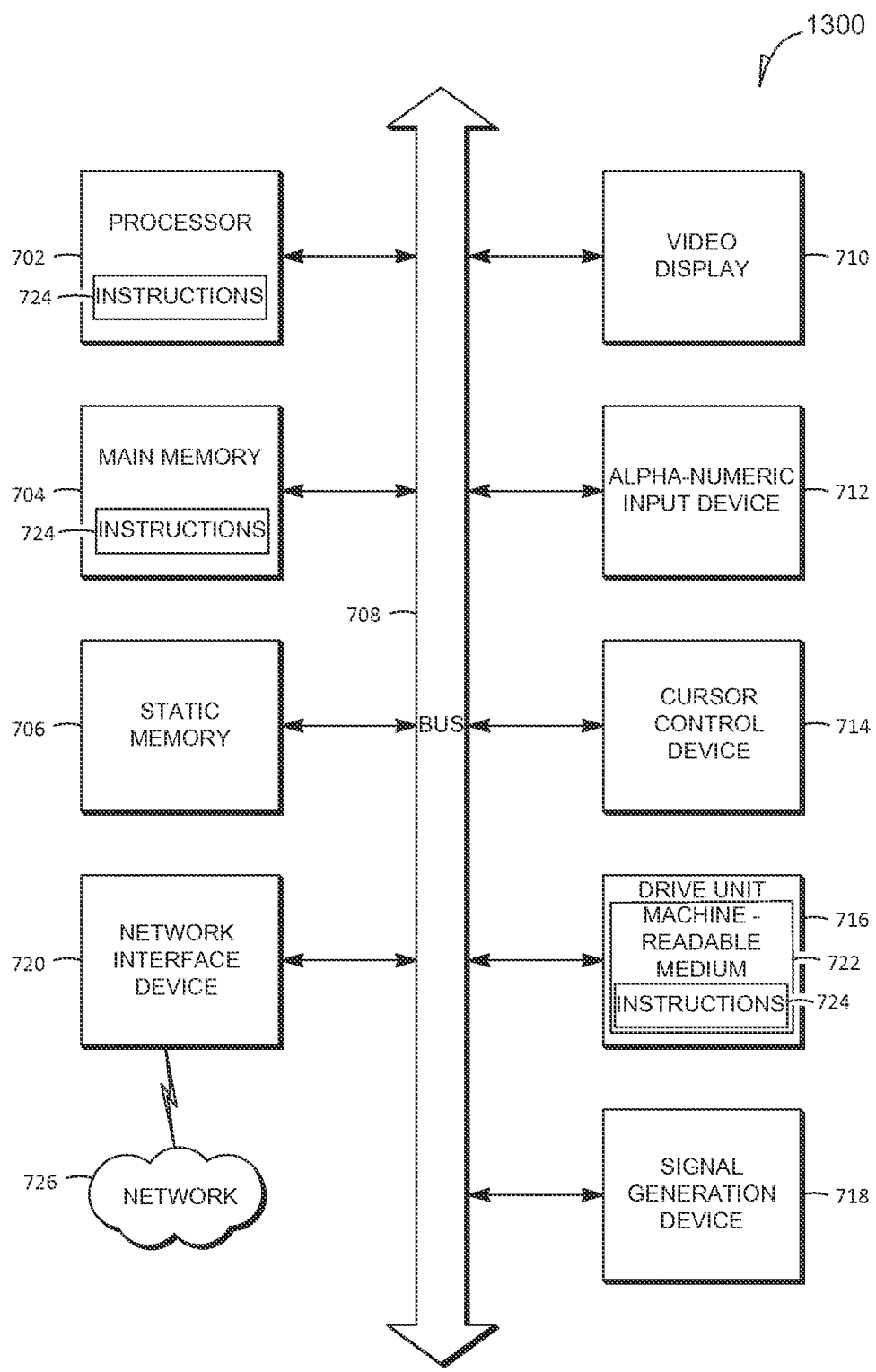
FIG. 13 is a diagrammatic representation of an example machine in the form of a computer system within which a set of instructions, for causing the machine to perform any one or more of the methodologies discussed herein, may be executed.

FIG. 13 is a diagrammatic representation of a machine in the example form of a computer system 1300 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 13013. The computer system 1300 may further include a video display unit 1310 (e.g., a liquid crystal display (LCD) or a cathode ray tube (CRT)). The computer system 1300 also includes an alpha-numeric input device 1312 (e.g., a keyboard), a user interface (UI) navigation device 1314 (e.g., a cursor control device), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software 1324) embodying or utilized by any one or more of the methodologies or functions described herein. The software 1324 may also reside, completely or at least partially, within the main memory 1304 and/or within the processor 1302 during execution thereof by the computer system 1300, with the main memory 1304 and the processor 1302 also constituting machine-readable media.

The software 1324 may further be transmitted or received over a network 1326 via the network interface device 1320 utilizing any one of a number of well-known transfer protocols (e.g., Hyper Text Transfer Protocol (HTTP)).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually, or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to visualize the reach of a post by a member of an on-line social networking system has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   detecting a post created by a focus member of an on-line social networking system;
   selecting, from the two or more posts, a post associated recent activity;
   accessing events data associated with one or more responses with respect to the post among members of the on-line social networking system who interacted with the post;
   generating, using at least one processor, a visualization of the events data, the visualization of the events data indicating:
   numbers of counts for the one or more responses to the post,
   connection distances of respective members of the on-line social network associated with the one or more responses to the post, a connection distance from the connection distances graphically indicating a degree of association between a member of the on-line social networking system and the focus member, and one or more groups graphically indicating the degree of association based on the connection distances of the respective members of the on-line social network associated with visual indications representing numbers of counts for one or more particular type of the one or more responses to the post; and causing displaying of the visualization of the events data on a display device of a client.

2. The method of claim 1, wherein the visualization includes a first area spatially separated from a second area, the first area including a representation of events with respect to the post triggered by members having a first degree of association with the focus member and the second area including a representation of events with respect to the post triggered by members having a second degree of association with the focus member.

3. The method of claim 1, wherein the visualization of the events data indicates numbers of counts of responses of a particular type of response to the post.

4. The method of claim 1, wherein the visualization of the events data is to be presented on a profile page of the focus member, the profile page provided by the on-line social networking system.

5. The method of claim 1, wherein the visualization of the events data is to be presented on a customized news feed page of the focus member, the customized news feed page provided by the on-line social networking system.

6. The method of claim 1, comprising monitoring activity in the on-line social networking system with respect to the post to collect the events data, for each event associated with the post; and determining an originator member that originated the event and a connection distance between the originator member and the focus member.

7. The method of claim 1, wherein detecting a further post by the focus member; collecting events data associated with the further post; and based on the events data associated with the post and the events data associated with the further post, generating an aggregate visualization.

8. The method of claim 1 wherein the visualization of the events data indicates a type of activity with respect to the post, the type of activity comprising one or more of a view, a click, a like, a comment, and a share.

9. The method of claim 1, wherein the post is an original post or a share, the share being a re-post of an update previously posted by another member of the on-line social network.

10. A computer-implemented system comprising:
a detector, implemented using at least one processor, to detect a post created by a focus member of an on-line social networking system;
a selector, implemented using at least one processor, to select, from the two or more posts, a post associated recent activity;
events data access module, implemented using at least one processor, to access events data associated with one or more responses with respect to the post among members of the on-line social networking system who interacted with the post;
a visualization generator, implemented using at least one processor, to generate a visualization of the events data, the visualization of the events data indicating:
numbers of counts for the one or more responses to the post,
connection distances of respective members of the on-line social network associated with the one or more responses to the post, a connection distance from the connection distances graphically indicating a degree of association between a member of the on-line social networking system and the focus member, and
one or more groups graphically indicating the degree of association based on the connection distances of the respective members of the on-line social network associated with visual indications representing numbers of counts for one or more particular type of the one or more responses to the post; and
a visualization delivery module, implemented using at least one processor, to cause displaying of the visualization of the events data on a display device of a client system by communicating the visualization of the events data to the client system.

11. The system of claim 10, wherein the visualization includes a first area spatially separated from a second area, the first area including a representation of events with respect to the post triggered by members having a first degree of association with the focus member and the second area including a representation of events with respect to the post triggered by members having a second degree of association with the focus member.

12. The system of claim 10, wherein the visualization of the events data indicates numbers of counts of responses of a particular type of response to the post.

13. The system of claim 10, wherein the visualization of the events data is to be presented on a profile page of the focus member, the profile page provided by the on-line social networking system.

14. The system of claim 10, wherein the visualization of the events data is to be presented on a customized news feed page of the focus member, the customized news feed page provided by the on-line social networking system.

15. The system of claim 10, comprising an activity monitor to monitor, using the at least one processor, activity in the on-line social networking system with respect to the post to collect the events data, for each event associated with the post; and a connection distance calculator to determine, using the at least one processor, an originator member that originated the event and a connection distance between the originator member and the focus member.

16. The system of claim 10, wherein the activity monitor is to: detect a further post by the focus member, and collect events data associated with the further post; and the visualization generator is to generate an aggregate visualization based on the events data associated with the post and the events data associated with the further post.

17. The system of claim 10 wherein the visualization of the events data indicates a type of activity with respect to the post, the type of activity comprising one or more of a view, a click, a like, a comment, and a share.

18. A machine-readable non-transitory storage medium having instruction data to cause a machine to perform operations comprising:
detecting a post created by a focus member of an on-line social networking system;
selecting, from the two or more posts, a post associated recent activity; accessing events data associated with one or more responses with respect to the post among members of the on-line social networking system who interacted with the post;
generating a visualization of the events data, the visualization of the events data indicating:

numbers of counts for the one or more responses to the post, connection distances of respective members of the on-line social network associated with the one or more responses to the post, a connection distance from the connection distances graphically indicating a degree of association between a member of the on-line social networking system and the focus member, and one or more groups graphically indicating the degree of association based on the connection distances of the respective members of the on-line social network associated with visual indications representing numbers of counts for one or more particular type of the one or more responses to the post; and causing displaying of the visualization of the events data on a display device of a client system by communicating the visualization of the events data to the client system.

* * * * *